# 3,150,155
PROCESS FOR THE PRODUCTION OF 19-HYDROXY-5α,10α-STEROIDS

Samuel Ladabaum, Mexico City, Mexico, assignor to Syntex Corporation, Panama, Panama, a corporation of Panama
No Drawing. Filed Sept. 16, 1963, Ser. No. 309,320
11 Claims. (Cl. 260—397.4)

The present invention relates to a novel process for the preparation of cyclopentanophenanthrene derivatives.

More particularly, the present invention relates to a process for the production of 19-hydroxy-5α, 10α-pregnanes and androstanes from the corresponding $\Delta^{5(10)}$-19-nor-steroids by treatment with carbon monoxide-hydrogen.

The obtainment of 19-hydroxy-10α-steroids is of great utility, for these are valuable compounds with physiological activity and also serve as intermediates in the preparation of other 19- substituted-10α-steroids, e.g., 19-halo, 19-lower alkyl, etc. which have very interesting pharmacological properties. For example, 19-hydroxy-10α-androstan-17β-ol-3-one and 17α-methyl-10α-androstane-17β, 19-diol-3-one have good anabolic properties with low androgenicity; 5α, 10α-pregnane-3β,6α, 19-triol-20-one has remarkable oral progestational properties and is completely devoid of any androgenicity.

In addition, the 19-hydroxy-10α-steroids obtained according to the present invention may be transformed into the corresponding important 10α-steroids, which are described in Belgium Patent No. 577,616, by conventional tosylation, followed by treatment of the resulting 19-tosylate with sodium iodide or lithium aluminum hydride, or by any other conventional reduction.

The novel process of the present invention is exemplified by the following scheme, wherein only the A and B rings of the steroid molecule are represented:

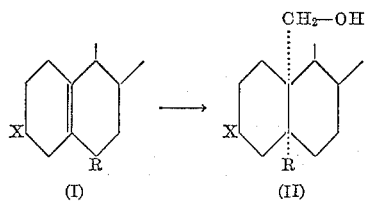

In the above formula X represents preferably α- or β-hydroxy or acyloxy, a keto group, hydrogen, a halogen atom, a lower alkyl group or the like; R represents preferably hydrogen, an α- or β-hydroxy or an α- or β-acyloxy group, a halogen atom, a lower alkyl group, an hydroxylower alkyl, a poly or mono halo lower alkyl or the like.

The starting compound (I) of the present process may be any steroid with a $\Delta^{5(10)}$ double bond, in particular, of the androstane, pregnane and spirostane series, and preferably of the androstane and pregnane series. There can be present a number of substituents in the molecule without interfering with the reaction of this invention. For example, it may have: keto groups at positions 2, 3, 7, 11, 12, 15, 16 and/or 20; lower alkyl groups, hydroxyl groups, acyloxy groups or halogen atoms at positions 1, 2, 3, 4, 5, 6, 7, 8, 9, 11, 12, 14, 15, 16, 17, 18, 20 and/or 21, etc. The presence of other double bonds in the molecule, e.g., between C–2 and C–3, C–6, and C–7, C–9 and C–11, etc., leads to the attack of thes double bonds by the carbon monoxide-hydrogen mixture with the consequent hydroxymethylation thereof, without interference with the normal addition of said mixture to the double bond between C–5 and C–10.

Examples of starting materials which may be used in the present process are: 19-nor-$\Delta^{5(10)}$-androsten-17β-ol-3-one, 17α-aliphatic hydrocarbon derivatives of 19-nor-$\Delta^{5(10)}$-androsten-17β-ol-3-one, 19-nor-$\Delta^{5(10)}$-androsten-3,17-β-diol and 17α-substituted derivatives thereof, 19-nor-$\Delta^{5(10)}$-androstene-3β,6α, 17β-triol, 19-nor-$\Delta^{5(10)}$-pregnene-3β,6α-diol-20-one, 16α-methyl-19-nor-$\Delta^{5(10)}$-pregnene-3β, 6α, 17α-triol-20-one, 19-nor-$\Delta^{5(10)}$-pregnene-3β,6α,-16α,17α-tetrol-20-one, 17α-ethinyl-19-nor-$\Delta^{5(10)}$-androstene-3β,6α,17β-triol, 19-nor-$\Delta^{5(10)}$-androstene-3β,6α·17β-triol and the like.

In practicing the process of the present invention, the starting $\Delta^{5(10)}$-19-nor steroid (I) of the type defined hereinbefore, is treated with a mixture of carbon monoxide and hydrogen, in the presence of a catalytic amount of a metal carbonyl, said metal being preferably of group VIII of the Periodic Table of the Elements, such as iron, cobalt or nickel carbonyls, and in particular dicobalt octacarbonyl, under pressures higher than normal, preferably between approximately 20 and 250 atmospheres, at temperatures that may range between about 60° C. to about 250° C., for a period of time of around 1 to 24 hours, preferably around 3 to 15 hours, in a suitable non-polar organic solvent, preferably an aromatic homocyclic solvent, such as toluene or benzene, thus affording the corresponding 19-hydroxy-10α-steroid (II), which is isolated and/or purified by conventional procedures known to those skilled in the art.

When the starting steroid (I) has only one double bond, i.e., between C–5 and C–10, the amount of carbon monoxide and hydrogen necessary for a complete conversion of such starting steroid is of approximately 1 molar equivalent of the former and of approximately 2 molar equivalent of the latter, but large excesses of both reagents are preferred for good yields in final product.

The proportion of one gas with respect to the other may vary within wide ranges and has no critical importance. Nevertheless, a 1:1 ratio is ordinarily used due to the relative facility for the preparation thereof, e.g., as synthesis gas.

The catalytic amount of metal carbonyl may range preferably between approximately 0.1 to 50% of the weight of starting steroid. Said metal carbonyl may be introduced as such into the reaction medium or may be produced in situ by conventional procedures, for example, from a salt of the corresponding metal or from the metal as such, preferably in a finely divided form, and carbon monoxide under the condition of the reaction. Examples of metal salts which produce carbonyls are: cobalt carbonate, cobalt sulfate, iron carbonate, iron nitrate, nickel carbonate, nickel chloride and the like.

In some instances the reaction of the present invention yields in addition to the 19-hydroxy-10α-steroid, the corresponding 5α-hydroxymethyl-10α-19-nor steroid, but the two final compounds are easily separated by conventional procedures, e.g., chromatography on alumina or silica gel, fractional crystallization, etc.

The following specific examples serve to illustrate but are not intended to limit the scope of the present invention.

Example I

Into a stainless steel autoclave of 500 cc. of capacity were introduced 10 g. of 19-nor-$\Delta^{5(10)}$-androsten-17β-ol-3-one, 150 cc. of toluene and 1.5 g. of cobalt carbonate. The autoclave was flushed with CO (carbon monoxide) and then compressed to 45 atmospheres of pressure with the same gas. Hydrogen was then introduced, till the pressure attained 90 atmospheres. The autoclave was closed and heated to 180° C. for 12 hours. The gases were vented cautiously, the reaction mixture removed from the autoclave and the toluene evaporated. The residue was dissolved in hot ethanol and the solution filtered through celite. The filtrate was evaporated to dryness. The residue crystallized from acetone-hexane to give 10α-androstane-17β,19-diol-3-one.

The compounds set forth hereinafter under A were treated by the above procedure, thus affording the corresponding products listed under B:

| A | B |
|---|---|
| 19-nor-Δ$^{5(10)}$-androsten-17β-ol-3-one acetate. | 10α-androstane-17β,19-diol-3-one 17-acetate. |
| 17α-methyl-19-nor-Δ$^{5(10)}$-androsten-17β-ol-3-one. | 17α-methyl-10α-androstane-17β,19-diol-3-one. |
| 17α-ethyl-19-nor-Δ$^{5(10)}$-androsten-17β-ol-3-one. | 17α-ethyl-10α-androstane-17β,19-diol-3-one. |
| 17α-methyl-19-nor-Δ$^{5(10)}$-androstene-3β,17β-diol. | 17α-methyl-10α-androstane-3β,17β,19-triol. |

Example II

In a stainless steel autoclave of 500 cc. of capacity, 44 g. of 19-nor-Δ$^{5(10)}$-androsten-17β-ol-3-one, 8 g. of dicobalt octacarbonyl (prepared according to Wender et al. "Inorganic Syntheses," vol. V, McGraw-Hill Book Co. Inc., New York, N.Y., 1957, p. 190) and 220 cc. of toluene were compressed with synthesis gas (1:1 hydrogen-carbon monoxide) to 230 atmospheres and were shaken at 200° C. for 4 hours. The reaction mixture was removed from the autoclave and refluxed until the catalyst decomposed and little color remained. The solution was then filtered, the filtrate evaporated to dryness and chromatographed on alumina to give predominantly 10α-androstane-17β,19-diol-3-one and in smaller amount 5α - hydroxymethyl - 19 - nor - 10α - androstan-17β-ol-3-one.

Example III 19-nor-Δ$^{5(10)}$-androsten-17β-ol-3-one was treated according to Example I, except that there were used 0.5 g. of cobalt carbonate, the reaction temperature was 150° C., the time was of 20 hours and there was used benzene instead of toluene, thus giving the same results.

Example IV 19-nor-Δ$^{5(10)}$-androsten-17β-ol-3-one, was treated according to Example I, except that there was used nickel chloride instead of cobalt carbonate, thus furnishing exactly the same compound.

Example V

Upon treatment of 19-nor-Δ$^{5(10)}$-androsten-17β-ol-3-one by the procedure described in Example I, except that iron nitrate was used instead of cobalt carbonate, giving the same results.

Example VI 19-nor-Δ$^{5(10)}$-androsten-17β-ol-3-one was treated according to Example II, except that 4 g. of nickel tetracarbonyl was used instead of 8 g. of dicobalt octacarbonyl, and the reaction time was of 12 hours, thus yielding the same results.

Example VII 19-nor-Δ$^{5(10)}$-androsten-17β-ol-3-one was treated in accordance with Example I, except that there was used fine nickel powder instead of cobalt carbonate, thus giving the same results.

Example VIII 19-nor-Δ$^{5(10)}$-androsten-17β-ol-3-one was treated by the procedure of Example VII, except that there was used fine iron powder instead of nickel, with exactly the same results.

Example IX

The starting materials set forth hereinafter under A (obtained according to Bowers, U.S. pat. appl. Ser. No. 236,724, filed November 9, 1962, from the corresponding 6,19-lactones of 5α-bromo-6β-hydroxy-19-oic acids by treatment with potassium hydroxide in methanol in reflux for about 1 hour) were treated according to Example I, thus yielding the corresponding products listed under B:

| A | B |
|---|---|
| 19-nor-Δ$^{5(10)}$-androstene-3β,6α,17β-triol. | 10α-androstane-3β,6α,17β,19-tetrol. |
| 19-nor-Δ$^{5(10)}$-pregnene-3β,6α-diol-20-one. | 5α,10α-pregnane-3β,6α,19-triol-20-one. |
| 19-nor-Δ$^{5(10)}$-pregnene-3β,6α,17α-triol-20-one. | 5α,10α-pregnane-3β,6α,17α,19-tetrol-20-one. |
| 16α-methyl-19-nor-Δ$^{5(10)}$-pregnene-3β,6α,17α-triol-20-one. | 16α-methyl-5α,10α-pregnane-3β,6α,17α,19-tetrol-20-one. |
| 16α-methyl-19-nor-Δ$^{5(10)}$-pregnene-3β,6α-diol-20-one. | 16α-methyl-5α,10α-pregnane-3β,6α,19-triol-20-one. |
| 17α-methyl-19-nor-Δ$^{5(10)}$-androstene-3β,6α,17β-triol. | 17α-methyl-10α-androstane-3β,6α,17β,19-tetrol. |

Example X

The procedure of Example I was repeated, except that hydrogen was introduced till the pressure attained 75 atmospheres instead of 90, thus giving similar results.

I claim:

1. A process for the production of a 19-hydroxy-5α,10α-steroid selected from the group consisting of the androstane and pregnane series which comprises treating the corresponding 19-nor-Δ$^{5(10)}$-steroid with a mixture of carbon monoxide and hydrogen in the presence of a catalytic amount of a carbonyl of a metal of group VIII of the Periodic Table, at elevated pressure and at a temperature of about 60° C. to about 250° C., for a period of time of 1 to 24 hours in a non-polar organic solvent.

2. The process of claim 1 wherein the pressure ranges between 20 and 250 atmospheres.

3. The process of claim 1 wherein the carbonyl is a cobalt carbonyl.

4. The process of claim 1 wherein the carbonyl is dicobalt octacarbonyl.

5. The process of claim 1 wherein the carbonyl is a nickel carbonyl.

6. The process of claim 1 wherein the carbonyl is an iron carbonyl.

7. The process of claim 1 wherein the non polar solvent is a homocyclic aromatic solvent.

8. The process of claim 1 wherein the non polar solvent is toluene.

9. The process of claim 1 wherein the non polar solvent is benzene.

10. The process of claim 1 wherein the metal carbonyl is formed in situ.

11. The process of claim 1 wherein the metal carbonyl is nickel tetracarbonyl.

No references cited.

UNITED STATES PATENT OFFICE
CERTIFICATE OF CORRECTION

Patent No. 3,150,155                          September 22, 1964

Samuel Ladabaum

It is hereby certified that error appears in the above numbered patent requiring correction and that the said Letters Patent should read as corrected below.

Column 1, lines 38 to 46, formula "(II)" should appear as shown below instead of as in the patent:

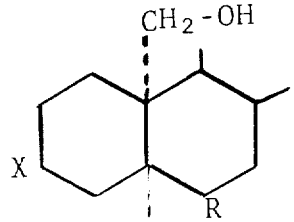

Signed and sealed this 1st day of June 1965.

(SEAL)
Attest:

ERNEST W. SWIDER  
Attesting Officer

EDWARD J. BRENNER  
Commissioner of Patents